(12) United States Patent
Lafer et al.

(10) Patent No.: US 10,378,592 B2
(45) Date of Patent: Aug. 13, 2019

(54) SHAFT-HUB CONNECTION

(71) Applicant: Magna Powertrain GmbH & Co KG, Lannach (AT)

(72) Inventors: Alois Lafer, Kainbach bei Graz (AT); Philipp Schlachter, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 177 days.

(21) Appl. No.: 15/605,111

(22) Filed: May 25, 2017

(65) Prior Publication Data
US 2017/0350496 A1 Dec. 7, 2017

(30) Foreign Application Priority Data
Jun. 3, 2016 (DE) .................. 10 2016 209 819

(51) Int. Cl.
| F16D 1/10 | (2006.01) |
|---|---|
| F16D 3/06 | (2006.01) |
| F16D 3/38 | (2006.01) |
| F16D 3/84 | (2006.01) |
| F16K 17/02 | (2006.01) |
| F16D 3/41 | (2006.01) |

(52) U.S. Cl.
CPC .............. F16D 3/84 (2013.01); F16D 1/10 (2013.01); F16D 3/387 (2013.01); F16K 17/02 (2013.01); *F16D 3/06* (2013.01); *F16D 3/41* (2013.01); *F16D 2001/103* (2013.01); *F16D 2300/06* (2013.01)

(58) Field of Classification Search
CPC ... F16D 1/10; F16D 3/06; F16D 3/382; F16D 3/387; F16D 3/41; F16D 3/84; F16D 2001/103; F16D 2300/06; F16H 57/04; F16H 57/0412; F16K 17/02; F16N 1/00; Y10S 464/904–906
USPC ...................... 464/11, 16, 17, 162, 904–906; 137/843–850
See application file for complete search history.

(56) References Cited

U.S. PATENT DOCUMENTS

| 1,950,579 | A | * | 3/1934 | Swenson | ................... | F16D 3/40 |
|---|---|---|---|---|---|---|
| | | | | | | 464/133 |
| 4,319,467 | A | * | 3/1982 | Hegler | ...................... | F16D 3/84 |
| | | | | | | 277/928 |
| 4,658,979 | A | * | 4/1987 | Mietz | ..................... | B65D 83/42 |
| | | | | | | 141/20 |
| 6,322,452 | B1 | * | 11/2001 | Kondo | ..................... | F16D 3/22 |
| | | | | | | 464/17 |

(Continued)

FOREIGN PATENT DOCUMENTS

| DE | 19624774 A1 | 1/1998 |
|---|---|---|
| DE | 102006022154 A1 | 11/2007 |
| JP | 2009185892 A | 8/2009 |

*Primary Examiner* — Josh Skroupa
(74) *Attorney, Agent, or Firm* — Dickinson Wright PLLC

(57) ABSTRACT

A shaft-hub connection, in particular for a gearbox of a motor vehicle, comprising a shaft, at least one hub which is connected to the shaft, wherein the hub is of tubular design and a shaft end of the shaft engages on a first hub end of the hub, and a closure element is arranged on a second hub end of the hub. A cavity is formed between the closure element and the shaft end of the shaft. The closure element is designed in such a manner that gaseous medium can escape via the closure element in the event of a positive pressure in the cavity.

5 Claims, 4 Drawing Sheets

(56) References Cited

U.S. PATENT DOCUMENTS

| | | | | |
|---|---|---|---|---|
| 6,540,616 | B2* | 4/2003 | Miller | F16D 3/223 464/17 |
| 6,699,129 | B2* | 3/2004 | Wang | F16D 3/223 464/17 |
| 6,988,949 | B2* | 1/2006 | Wang | F16D 3/223 464/17 |
| 7,204,760 | B2* | 4/2007 | Wang | F16D 3/84 464/17 |
| 8,197,346 | B2* | 6/2012 | Miller | F16D 3/843 464/17 |
| 8,375,994 | B2* | 2/2013 | Olszewski | F16K 15/144 137/845 |
| 8,721,461 | B2* | 5/2014 | LaMothe | F16D 3/84 464/17 |
| 8,925,574 | B2* | 1/2015 | Wilson | B60B 35/08 137/846 |
| 8,985,142 | B2* | 3/2015 | Wildfang | B05B 1/3006 137/843 |
| 9,028,332 | B2* | 5/2015 | Ketchel | F16D 3/84 464/906 |
| 2017/0030472 | A1* | 2/2017 | Hall | F16K 21/04 |

* cited by examiner

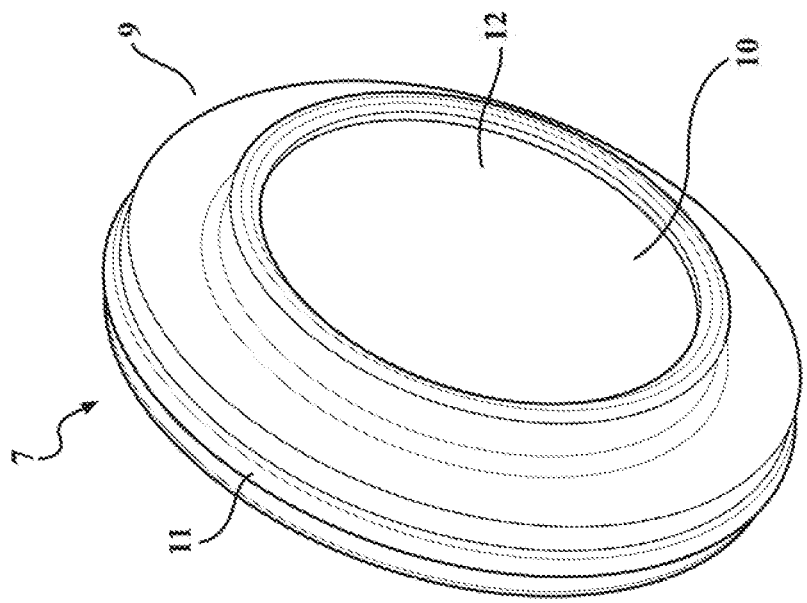
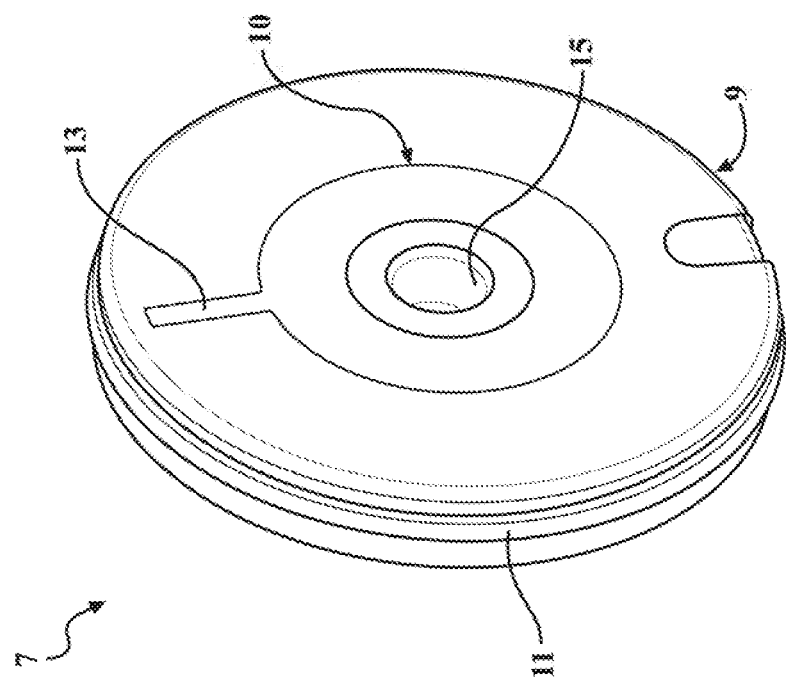

SHAFT-HUB CONNECTION

CROSS-REFERENCE TO RELATED APPLICATIONS

This application claims the benefit and priority of German Application No. DE102016209819.5 filed Jun. 3, 2016. The entire disclosure of the above application is incorporated herein by reference.

TECHNICAL FIELD

The present invention relates generally to a shaft-hub connection for use in a gearbox of a motor vehicle. More particularly, the shaft-hub connection comprises a shaft, at least one hub which is connected to the shaft, wherein the hub is of tubular design and a shaft end of the shaft engages on a first hub end of the hub, and a closure element is arranged on a second hub end of the hub.

BACKGROUND OF THE INVENTION

This section provides background information related to the present disclosure which is not necessarily prior art.

Shaft-hub connections are widespread in the field of mechanical engineering. They serve for transmitting a torque from a shaft to a hub, or vice versa.

A shaft-hub connection has to be protected against contamination by solid and liquid media. When a lubricant is used, it is furthermore necessary to prevent the lubricant from escaping from the shaft-hub connection. A customary manner of doing this is to design the hub to be closed on one side and furthermore to provide a seal in the region of the engagement of the shaft in the hub. For example, DE 10 2006 022 154 A1 describes such a design of an arrangement with at least one shaft and at least one hub connected to said shaft.

However, during the fitting together of shaft and hub, the problem arises that, when a hub is closed on one side, a positive pressure arises in a cavity between that part of the shaft which extends in the hub and the closed hub end, the positive pressure making the fitting of the shaft together with the hub more difficult and having a negative influence on the reliability of the shaft-hub connection during operation, i.e. during a transmission of torque via the shaft-hub connection.

SUMMARY OF THE INVENTION

This section provides a general summary of the disclosure, and is not a comprehensive disclosure of its full scope or all of its features.

It is therefore the object of the invention to specify an alternative shaft-hub connection which, firstly, is distinguished by a simple design and, secondly, ensures reliable operation.

The object is achieved by a shaft-hub connection, in particular for a gearbox of a motor vehicle. The shaft-hub connection comprising a shaft, at least one hub which is connected to the shaft, wherein the hub is of tubular design and a shaft end of the shaft engages on a first hub end of the hub, and a closure element is arranged on a second hub end of the hub. A cavity is formed between the closure element and the shaft end of the shaft, wherein the closure element is designed in such a manner that gaseous medium can escape via the closure element in the event of a positive pressure in the cavity.

According to the invention, the shaft-hub connection has a shaft and at least one hub, wherein the shaft and the at least one hub are connected for conjoint rotation.

According to the present invention, the hub is of tubular design, i.e. an axial interior space passes through it.

The hub has, according to the invention, a first hub end and a second hub end. A shaft end of the shaft engages in the first hub end and the closure element is arranged on the second hub end. According to the invention, a cavity is formed between the closure element and the shaft end of the shaft. The cavity is therefore bounded by that shaft end of the shaft which engages in the hub at the first hub end, the closure element and the tubular hub itself.

According to the present invention, the closure element is designed in such a manner that gaseous medium can escape via the closure element in the event of a positive pressure in the cavity, the positive pressure arising in the cavity in particular during the engagement of the shaft in the hub.

By means of the design according to the invention of the shaft-hub connection, in particular the arrangement of a gas-permeable closure element at the end of the hub at which the shaft does not engage in the hub, pressure between the cavity of the hub and the external region of the hub can be equalized in a simple manner and therefore shaft and hub can be easily fitted together. Furthermore, the arrangement of the closure element prevents undesirable solid and liquid material from penetrating the cavity of the hub and, when required, suppresses an undesirable escape of lubricants from the shaft-hub connection.

The closure element is preferably manufactured at least in two parts, namely from a support component and a venting component. The venting component has a venting function and also a sealing function. Particularly preferably, the venting component is movable section by section relative to the support component in the event of positive pressure in the cavity of the hub.

In an advantageous variant embodiment, the venting component of the closure element is manufactured from an elastic material.

Furthermore, the support component is preferably partially insert-moulded by the venting component.

In a preferred variant embodiment of the shaft-hub connection, the venting component of the closure element has a first portion and a second portion, wherein the first portion is connected to the second portion via a connecting portion. The first portion of the venting component is preferably of annular design and is arranged in an outer circumferential groove of the support component of the closure element. The first portion of the venting component serves in the region of the second hub end for the seal between the hub and the closure element. The second portion of the venting component is preferably of substantially cup-shape design, wherein the second portion of the venting component overlaps a central opening in the support component in a closing manner. In the event of a positive pressure in the cavity formed between the shaft end of the shaft and the closure element in the interior of the tubular hub, the second portion of the venting component is movable relative to the support component and can thus open up the central opening in the support component.

Furthermore, it is of advantage if a filter element is arranged in the central opening in the support component.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention is described below by way of example with reference to the drawings. The drawings described herein are for illustrative purposes only of selected embodiments and not all possible implementations, and are not intended to limit the scope of the present disclosure.

FIG. 4a shows a first perspective view of a closure element (cavity-side view); and FIG. 4b shows a second perspective view of a closure element according to FIG. 4a (external-region-side view).

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
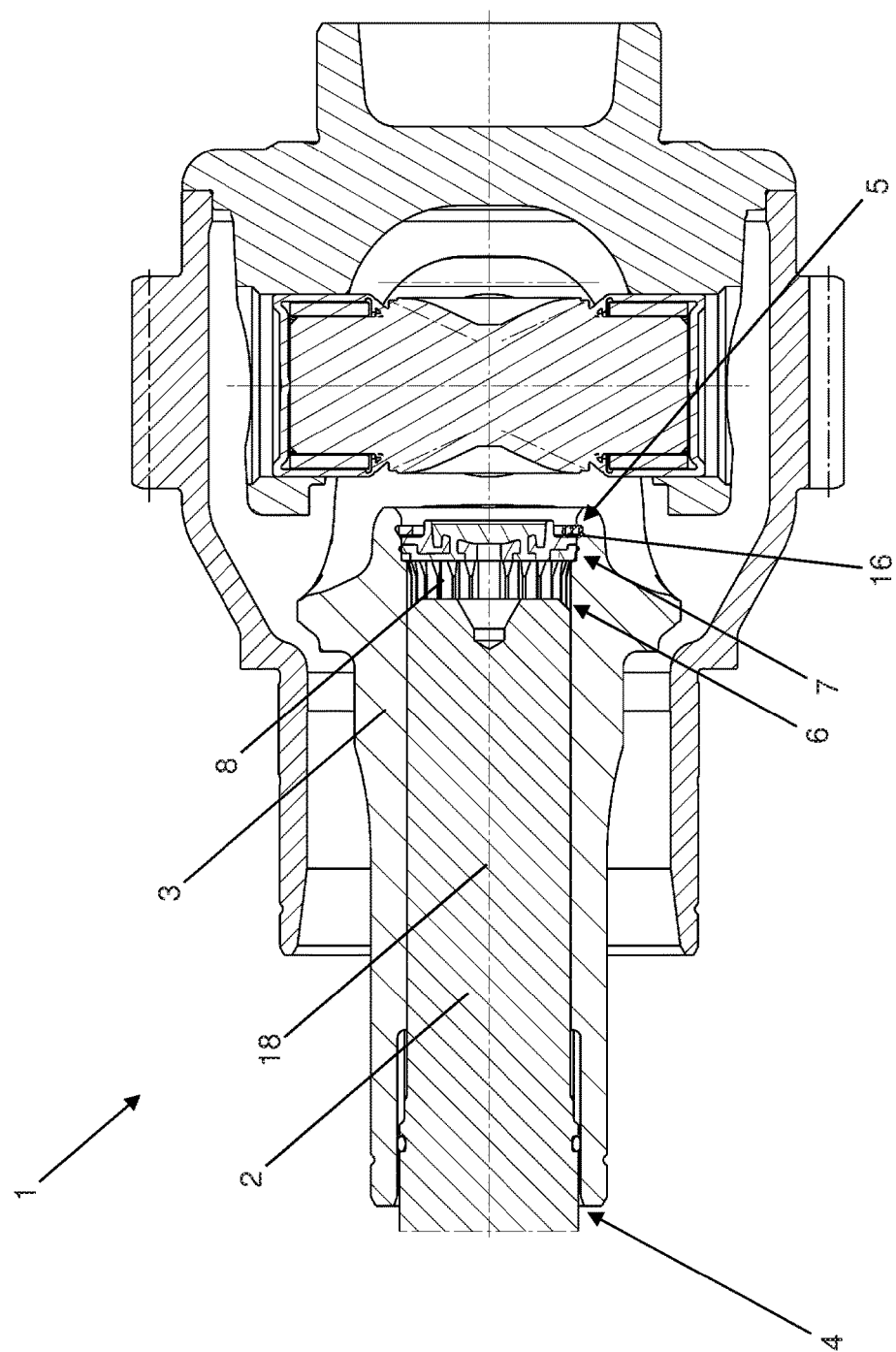
FIG. 1 shows a sectional view of an exemplary shaft-hub connection as part of a gearbox of a motor vehicle and which is constructed in accordance with the teachings of the present invention.

FIG. 1 shows a sectional view of an exemplary shaft-hub connection 1 as part of a gearbox of a motor vehicle. The shaft-hub connection 1 in FIG. 1 comprises a shaft 2 with an external toothing and a hub 3 which is of substantially tubular design and has an internal toothing corresponding to the external toothing of the shaft 2. A shaft end 6 of the shaft 2 engages on a first hub end 4 of the hub 3—shaft 2 and hub 3 are connected to each other for conjoint rotation.

A closure element 7 is arranged on a second hub end 5 of the hub 3. A cavity 8 is formed between the closure element 7 and the shaft end 6 of the shaft 2 in the interior of the tubular hub 3. The closure element 7 is axially secured in the region of the second hub end 5 of the hub 3 via a securing ring 16. However, an axial securing of the closure element 7 in the region of the second hub end 5 of the hub 3 can also take place in another customary manner. The term "axially" corresponds to a direction along or parallel to a longitudinal axis 18 of the shaft-hub connection 1.

Figure 2B:
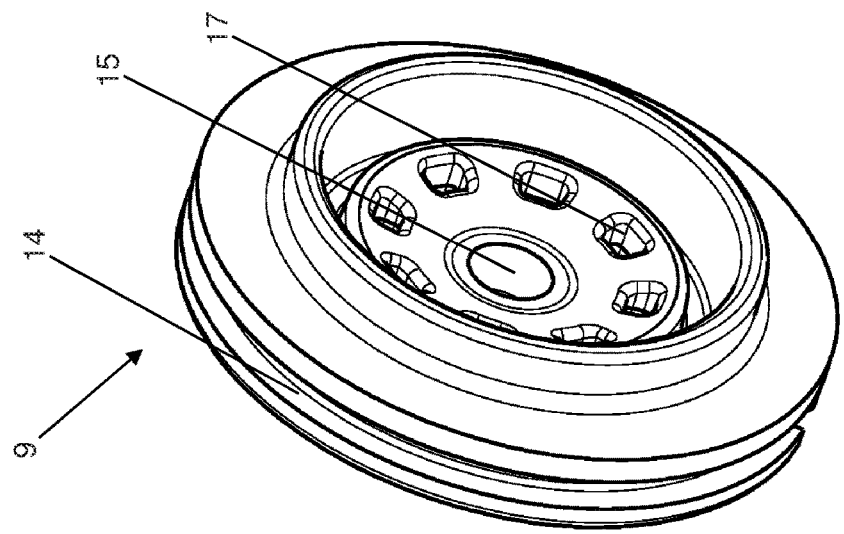
FIG. 2b shows a second perspective view of a support component of a closure element according to FIG. 2a (external-region-side view)
Figure 2A:
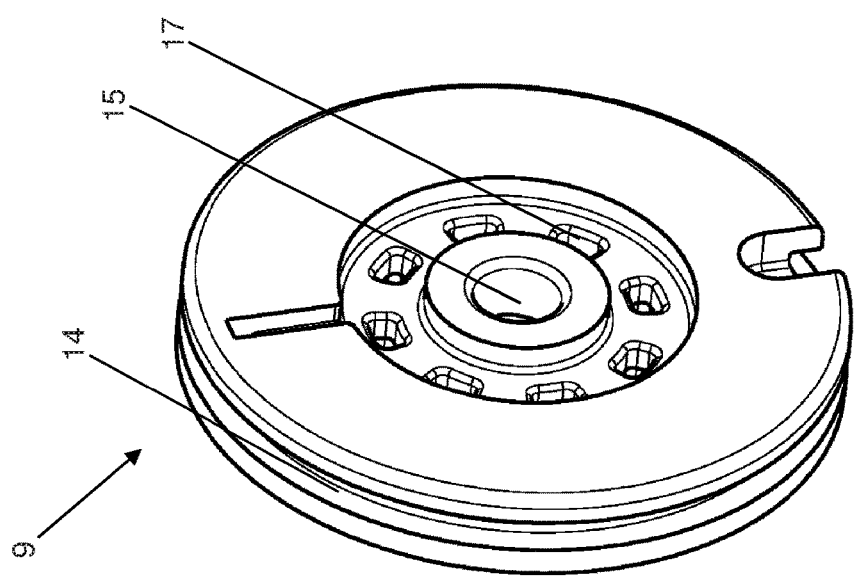
FIG. 2a shows a first perspective view of a support component of a closure element (cavity-side view)
Figure 3A:
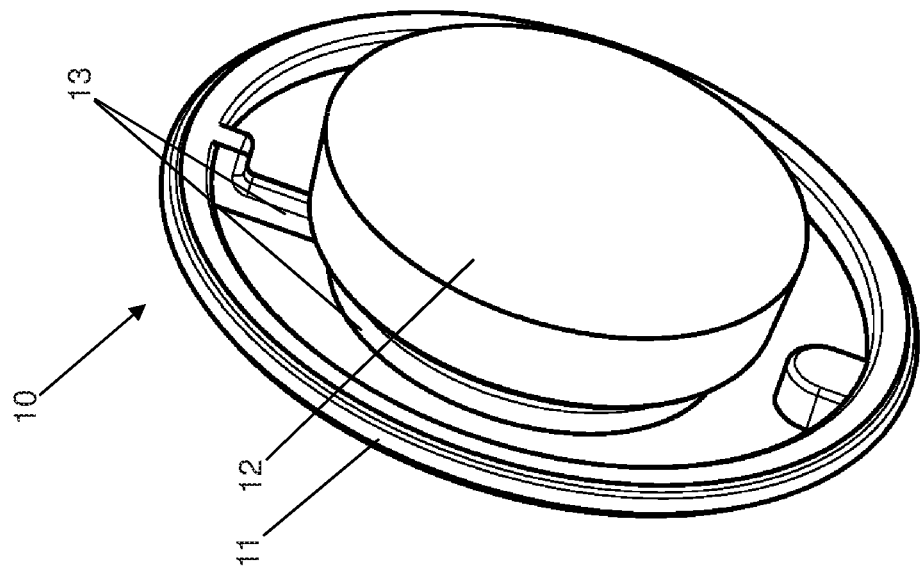
FIG. 3a shows a first perspective view of a venting component of a closure element (cavity-side view)
Figure 3B:
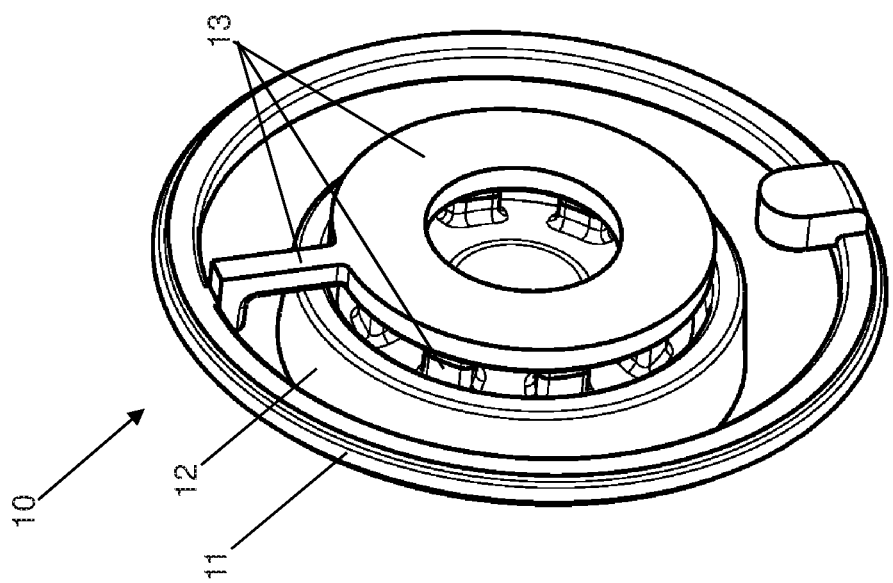
FIG. 3b shows a second perspective view of a venting component of a closure element according to FIG. 3a (external-region-side view)

The closure element 7 is illustrated in detail in FIG. 2a and FIG. 2b, in FIGS. 3a and 3b and also in FIGS. 4a and 4b. The exemplary closure element 7 (FIG. 4a, FIG. 4b) is designed in two parts and comprises a support component 9 (FIG. 2a, FIG. 2b) and a venting component 10 (FIG. 3a, FIG. 3b). FIG. 4a shows the closure element 7 in a first perspective view—that side of the closure element 7 which faces the shaft end 6 of the shaft 2 in an installed state of the closure element 7 can be seen. FIG. 4b shows the closure element 7 in a second perspective view—that side of the closure element 7 which faces away from the shaft end 6 of the shaft 2 in an installed state of the closure element 7 can be seen.

FIG. 2a shows the support component 9 of the closure element 7 in a first perspective view—that side of the support component 9 which faces the shaft end 6 of the shaft 2 in an installed state of the closure element 7 can be seen. FIG. 2b shows the support component 9 of the closure element 7 in a second perspective view—that side of the support component 9 which faces away from the shaft end 6 of the shaft 2 in an installed state of the closure element 7 can be seen.

The support component 9 is manufactured from a non-elastic hard material, such as, for example, a plastic, a composite material or a metallic material. The support component 9 is of substantially annular design with a central opening 15. A filter element can optionally be arranged in the region of the central opening 15 in the support component 9. The central opening 15 in the support component 9 is circumferentially surrounded by a plurality of uniformly spaced-apart recesses 17. The central opening 15 in the support component 9 is connected to the cavity 8 which is formed between the closure element 7 and the shaft end 6 of the shaft 2.

FIG. 3a shows the venting component 10 of the closure element 7 in a first perspective view—that side of the venting component 10 which faces the shaft end 6 of the shaft 2 in an installed state of the closure element 7 can be seen. FIG. 3b shows the venting component 10 of the closure element 7 in a second perspective view—that side of the venting component 10 which faces away from the shaft end 6 of the shaft 2 in an installed state of the closure element 7 can be seen.

The venting component 10 is manufactured from an elastic material and partially surrounds the support component 9. The support component 9 is partially insert-moulded with the elastic material of the venting component 10—the closure element 7 is manufactured in such a way. The elastic material forming the venting component 10 penetrates during the insert-moulding process into points provided therefor on the support component 9 of the closure element 7, such as the recesses 17 in the exemplary embodiment illustrated here, and is fastened in such a manner to the support component 9 of the closure element 7.

The venting component 10 has a first portion 11 and a second portion 12. The first portion 11 of the venting component 10 of the closure element 7 is connected to the second portion 12 of the venting component 10 of the closure element 7 via a connecting portion 13. The first portion 11 of the venting component 10 is of substantially annular design and is arranged in an outer circumferential groove of the support component 9. The second portion 12 of the venting component 10 is of substantially cup-shape design and overlaps a central opening 15 in the support component 9 of the closure element 7. The second portion 12 of the venting component is arranged on that side of the closure element 7 which faces away from the shaft end 6 of the shaft 3. The first portion 11 of the venting component 10 of the closure element 7 is arranged between the support component 9 of the closure element 7 and the hub 3, with reference to FIG. 2, and serves in the region of the second hub end 5 of the hub 3 as a sealing component between the hub 3 and the support component 9 of the closure element 7. Furthermore, the outer geometry of the support component 9 in combination with the first portion 11 of the venting component 10 is responsible for the positioning and fixing of the closure element 7 in the region of the second hub end 5 of the hub 3.

When a positive pressure arises in the cavity 8 between the shaft end 6 of the shaft 2 and the closure element 7, for example during the assembly of the shaft 2 and the hub 3, more precisely the pushing of the shaft end 6 of the shaft 2 at the first hub end 4 into the tubular hub 3, the second portion 12 of the venting component 10 moves axially relative to the support component 9 of the closure element 7—the second portion 12 moves axially, to the right with reference to FIG. 1, and opens up the central opening 15 of the support component 9 such that gas can be exchanged between the cavity 8 of the hub 3 and the external region of the hub 3. If the positive pressure in the cavity 8 has been dissipated, the second portion 12 of the venting component 10 is pulled back again because of the elastic properties of the venting component 10 into a closed position, namely into the position in which the second portion 12 of the venting component 10 closes the central opening 15 in the support component 9, and thus provides a seal against liquid and solid media.

Depending on the positive pressure prevailing in the cavity 8, the venting component 10 of the closure element 7 can therefore take up the closed position and an open position, namely the position in which gas is exchanged between the cavity 8 and the external region of the hub 3 via the central opening 15 in the support component 9. By means of the cup-shape design of the second portion 12 of the venting component 10 of the closure element 7, an outlet and/or an inlet of gaseous media from and/or into the cavity 8 is possible, but an outlet and/or an inlet of solid and/or liquid media is substantially prevented.

An outlet and/or inlet of solid, liquid and/or gaseous media via the first portion 11 of the venting component 10 is suppressed by the design of the first portion 11 of the venting component 10 of the closure element 7 and the design of the support component 9 of the closure element 7 and the arrangement of the first portion of the venting component between the hub 3 and the support component 9 of the closure element 7. The first portion 11 of the venting component 10 of the closure element 7 therefore serves for sealing between the hub 3 and the closure element 7, more precisely the support element 9 of the closure element 7. In such a manner, in the event of positive pressure in the cavity 8 between the shaft end 6 of the shaft 2 and the closure element 7, targeted venting of the cavity 8 can take place via the second portion 12 of the venting component 10 of the closure element 7.

By means of the configuration of the second portion 12 and in particular of the connecting portion 13, the axial movement of the second portion 12 of the venting component 10 of the closure element 7 relative to the support component 9 of the closure element 7 can be adjusted with respect to the positive pressure arising in the cavity 8.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS 1 shaft-hub connection
2 shaft
3 hub
4 first hub end
5 second hub end
6 shaft end
7 closure element
8 cavity
9 support component
10 venting component
11 first portion
12 second portion
13 connecting portion
14 groove
15 central opening
16 securing ring
17 recess
18 longitudinal axis

The invention claimed is:

1. A Shaft-hub connection, in particular for a gearbox of a motor vehicle, comprising a shaft and at least one hub which is connected to the shaft, wherein the hub is of tubular design and a shaft end of the shaft engages on a first hub end of the hub, and a closure element is arranged on a second hub end of the hub, wherein a cavity is formed between the closure element and the shaft end of the shaft, wherein the closure element is designed in such a manner that gaseous medium can escape via the closure element in the event of a positive pressure in the cavity;

wherein the closure element is manufactured at least in two parts including a support component and a venting component;

wherein the venting component of the closure element has a first portion and a second portion, and wherein the first portion is connected to the second portion via a connecting portion;

wherein the first portion of the venting component is of annular design and is arranged in an outer circumferential groove of the support component of the closure element.

2. The shaft-hub connection according to claim 1, wherein the venting component is movable section by section relative to the support component in the event of positive pressure in the cavity of the hub.

3. The shaft-hub connection according to claim 1, wherein the venting component of the closure element is manufactured from an elastic material.

4. The shaft-hub connection according to claim 1, wherein the support component is partially insert-moulded by the venting component.

5. The shaft-hub connection according to claim 1, wherein the second portion of the venting component is of substantially cup-shaped design which overlaps a central opening in the support component in a closing manner and is movable relative to the support component in the event of positive pressure in the cavity of the hub.

* * * * *